Figure 1:
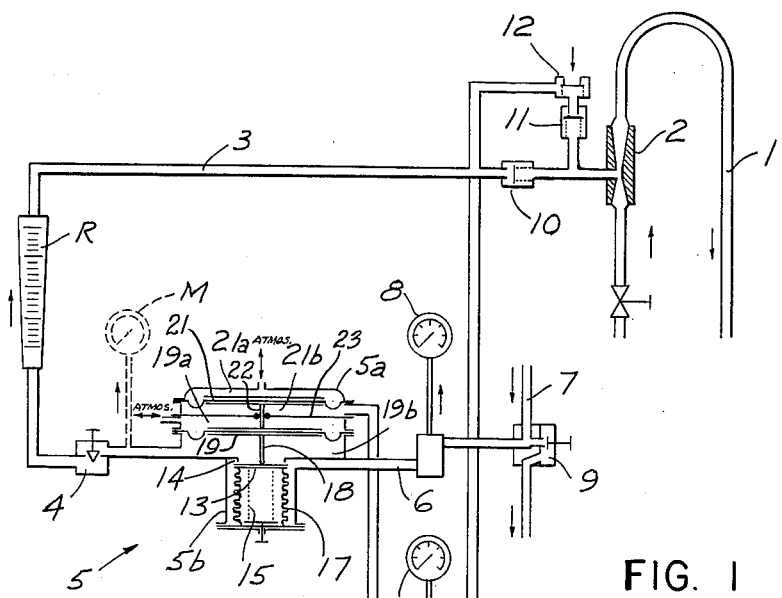

April 24, 1962  KARL-HEINZ ARENHOLD  3,030,974
QUANTITY CONTROLLED CHLORINATING INSTALLATION
Filed June 28, 1960

INVENTOR.
KARL-HEINZ ARENHOLD
BY Hane and Nydick
ATTORNEYS

United States Patent Office 3,030,974
Patented Apr. 24, 1962

3,030,974
QUANTITY CONTROLLED CHLORINATING
INSTALLATION
Karl-Heinz Arenhold, Karlsruhe-Durlach, Germany, assignor to Chlorator G.m.b.H., Grotzingen, Karlsruhe, Germany, a German company
Filed June 28, 1960, Ser. No. 39,365
Claims priority, application Germany July 3, 1959
10 Claims. (Cl. 137—100)

The present invention relates to an installation for admixing chlorine to water for the purpose of sterilization, and more particularly to an installation in which the amount of admixed chlorine is automatically regulated in accordance with the rate of flow of the water to be treated.

It is known in installations of this kind to tap the water main to be treated on both sides of a constriction or similar obstruction inserted in the water main. The pressure drop across such constriction then varies with the rate of flow through the main and such variations of the pressure drop are utilized to operate a control device. The mixing of the water and the chlorine is effected by adding chlorine to the water flow through a by-pass line branched off the main and returned into the same. The feed of chlorine into the branch line is controlled by a control valve such as a vacuum reduction valve which in turn is controlled by the aforesaid control device.

In installations of the general kind above referred to as heretofore known, electro-hydraulically operated control devices are generally used. Installations using such control devices are inherently complex, sensitive and expensive in maintenance. They also have the disadvantage that they are dependent upon the functioning of an electric power supply and a failure of the power supply, which is practically unavoidable from time to time especially in outlying districts, entails a failure of a sterilization of the water consumed during the power failure.

It is the broad object of the invention to provide an installation of the general kind above-referred to, which is simple in design, inexpensive in construction, reliable in operation and independent of an electric power supply.

A more specific object of the invention is to provide a novel and improved installation which automatically and accurately supplies to the water main a quantity of chlorine varying in accordance with the changes in the flow of water to be treated.

Another more specific object of the invention is to provide a novel and improvised installation, the dosing accuracy of which is not affected by variations of the chlorine pressure due to a depletion of the chlorine supply and changes in the ambient temperature.

Still another more specific object of the invention is to provide a novel and improved installation in which the control device controlled by the rate of flow of the water to be treated and controlling the vacuum reduction valve, may be disposed remote from the valve and closely adjacent to the water main. Such a deposition of the control device simplifies the layout of the installation.

And still another more specific object of the invention is to provide in the installation a measuring instrument for measuring the volume of water flowing through the water main and operated by the vacuum caused in the control device by the aforesaid pressure drop.

A still further object of the invention is to provide a novel and improved installation in which the vacuum required for controlling the chlorine feed in accordance with the rate of flow of the water to be treated can be obtained by tapping the injector for operating the vacuum reduction valve. The installation, according to the invention, permits such an arrangement due to the slight vacuum required for the control of the vacuum reduction valve, whereas in installations as heretofore known an auxiliary injector is generally required for the same purpose, due to the greater power required for operating the dosing valve.

Other and further objects, features and advantages of the invention will be pointed out hereinafter and set forth in the appended claims forming part of the application.

In the accompanying drawing a preferred embodiment of the invention is shown by way of illustration and not by way of limitation.

Figure 2:
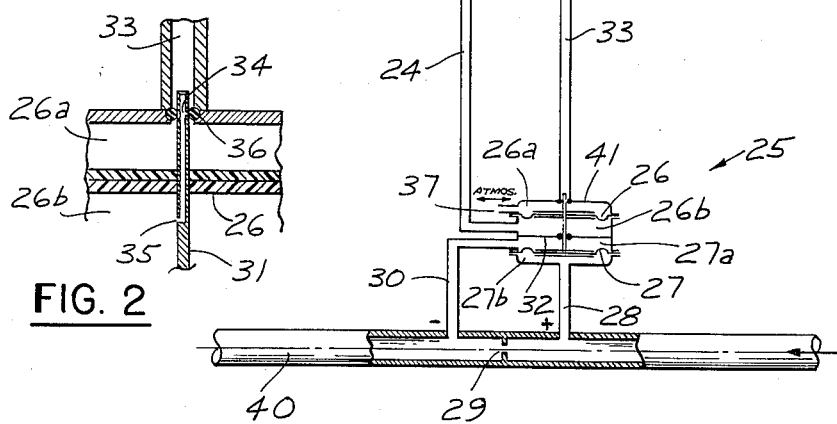

In the drawing:
FIG. 1 shows diagrammatically an installation according to the invention, and
FIG. 2 is a detail of the installation on an enlarged scale.

Referring now to the figures, only those parts of the installation are shown in detail which are essential for the understanding of the invention.

The water to which the chlorine is to be added flows through a conduit 1. This conduit should be visualized as part of a by-pass line branched off from a water main 40 and returned into the same. An injector 2, such as a venturi type injector, is included in conduit 1. A suction pipe 3 is connected to the throat of the injector and leads to a vacuum reduction valve generally designated by 5. Chlorine is supplied to valve 5 through pipes 6 and 7. Pipe 7 should be visualized as being connected to a chlorine pressure bottle of conventional design. A suitably calibrated manometer 8 indicates the available chlorine supply. A valve 9 serves to discharge chlorine remaining in the pipes into the atmosphere when the installation is shut down and the chlorine bottle has been closed. As a further safety device, a one-way valve 10 is included in line 3 which prevents the ingress of water into suction pipe 3 and other parts of the installation under vacuum. As a further safety device, a vacuum breaker 12 is provided which may comprise a spring-loaded valve disc which opens and admits air into the vacuum pipe 3 when the vacuum in the installation is above a pre-determined value to protect the rather delicate diaphragm assembly of valve 5. A one-way valve 11 prevents the access of water to vacuum breaker 12.

Vacuum reduction valve 5 comprises a valve housing composed of an upper part 5a and a bottom part 5b. The valve housing includes a valve opening defined by a valve seat 14. A valve disc 13 coacts with this opening and is urged by a loaded compression spring 15 toward its position closing the valve opening. As can be clearly seen in FIG. 1, the top side of disc 13 is exposed to the vacuum in suction pipe 3 as controlled and set by a regulating valve 4 and the bottom side of the disc is exposed to the pressure of chlorine fed into the bottom part 5b of the housing through pipe 6. A bellows 17, preferably made of metal, extends between the bottom of housing part 5b and disc 13 and is secured at its ends to the disc and the housing bottom respectively. The diameter of the valve seat 14 and the effective diameter of bellows 17 are so correlated that the pressure of the chlorine upon disc 13 is neutralized. Accordingly, the force which acts upon disc 13 in the valve closing direction is determined only by the pressure of spring 15 and independent of variations of the chlorine pressure due to depletion of the chlorine supply or changes in the ambient temperature. This pressure neutralizing arrangement of valve 5 is more fully described in my co-pending application entitled "Pressure Reduction Valve," Serial No. 39,358, filed June 28, 1960.

A partition wall 23 divides the upper part 5a of the housing, that is the housing part above valve seat 14 in two superimposed compartments. The lower compartment is further sub-divided by a diaphragm 19 in two chambers 19a and 19b. Similarly, the upper compartment is divided by a diaphragm 21 in two chambers 21a and 21b. The upper chamber 19a is open to the atmosphere and the lower chamber 19b participates in the vacuum in suction pipe 3. Diaphragm 19 is peripherally secured on the housing wall and will flex corresponding to the pressure differential between the atmospheric pressure in chamber 19a and the vacuum pressure in chamber 19b. Diaphragm 19 mounts a depending pin 18 which rests against disc 13 and as a result, will force disc 13 more or less away from seat 14, depending upon the aforesaid pressure differential and against the action of spring 15.

The means for varying the quantity of chlorine added to the water to be treated in accordance with changes in the volume of water flowing through water main 40 comprises the second diaphragm 21 which is peripherally held in upper housing part 5a. Diaphragm 21 mounts a preferably centrally disposed actuating pin 22 which extends through partition wall 23 slidable but in sealing engagement therewith and abuts against diaphragm 19. The upper chamber 21a defined by diaphragm 21 is open to the atmosphere but the lower chamber 21b may be under vacuum or connected to the atmosphere as will be explained hereinafter. Accordingly, the flexing of diaphragm 21 will be controlled by the pressure differential between chambers 21a and 21b and any downward flexing of diaphragm 21 will be transmitted through pin 22 to diaphragm 19 and hence through pin 18 to valve disc 13. As a result, the force acting upon disc 13 in the opening direction is a composite force supplied by both diaphragms. The pressure differential acting upon diaphragm 21 is controlled by a control device 25 which in turn is controlled by the rate of flow through water main 40.

The control device 25 is similar in its design to the valve assembly 5. It comprises a housing 41 which is divided by a wall 32 in two superimposed compartments. Each compartment is further divided by two parallel disposed diaphragms 26 and 27 to define upper and lower chambers 26a, 26b and 27a, 27b, respectively. Chamber 26b communicates with chamber 21b through a pipe 24 and chamber 26a is open to the atmosphere through a vent 37. Chamber 27b is connected through a pipe 28 with main 40 upstream of a constriction 29 in the main and chamber 27a is connected through a pipe 30 with main 40 downstream of constriction 29. As is evident, constriction 29 will cause a pressure drop in main 40 and the magnitude of this pressure drop is dependent upon the flow of water through the main. Accordingly, the pressure differential acting upon diaphragm 27 is a function of the flow of water through main 40.

The two diaphragms 26 and 27 of control device 25 are rigidly joined by a valve tube 31 which is slidably extended through wall 32 in sealing engagement therewith. Tube 31 protrudes from housing 41 and into a pipe 33 which connects chamber 26a to the vacuum pipe 3. As is shown more in detail in FIG. 2, tube 31 has two small ports 34 and 35. Port 35 issues within chamber 26b, which as mentioned before, is connected to valve 5 through pipe 24 and port 34 is located at the level of a sealing ring 36 in tube 31 and thus closed by the ring when the pressure drop across constriction 29 has a predetermined value.

The control device 25 operates as follows:

Assuming that the flexing of diaphragm 27 is changed in response to a change in the pressure drop across constriction 29, then such change in the configuration of diaphragm 27 will cause a corresponding longitudinal displacement of tube 31. From the position of FIG. 2 in which port 34 is sealed by a ring 36 and in which the tube has no effect upon the control function of device 25, the tube may either be moved upwardly into a position in which port 34 is open within pipe 33 or downward into a position in which it is open within compartment 26a. In the first postion tube 31 is connected to the vacuum in pipe 3 and the vacuum in that pipe is extended through the always open port 35 into chamber 26b and from this chamber through pipe 24 into chamber 21b. In the other position port 34 is connected through vent 37 to the atmosphere and hence chamber 26b and with it chamber 21b through pipe 24 are also connected to the atmosphere.

If the rate of flow through main 40 increases, both diaphragms 26 and 27 are flexed upwardly. As a result, chamber 21b is evacuated through pipe 33, ports 34 and 35, chamber 26b and pipe 24 as previously described. Diaphragm 21 is now flexed downwardly and its downward movement is superimposed upon the control action of diaphragm 19. Accordingly, the opening of valve 5 is increased over and above the opening demanded by diaphragh 19 only, by an amount which is a function of the increase of the water flow through main 40.

If the flow of water through main 40 decreases and hence the pressure differential acting upon diaphragm 27, port 34 will be drawn into position in which it communicates with the atmosphere in vent 37. As a result, the valve opening caused by the combined action of diaphragms 19 and 21 is reduced in accordance with the decrease of the water flow through main 40.

As is now apparent, control tube 31 will continuously, accurately and smoothly move up and down in accordance with changes in the pressure drop across constriction 29 and the atmospheric pressure and the injector vacuum are continually compared by diaphragm 21. Adjustments are made, therefore, in accordance with the pressure ratio between the atmospheric pressure and the injector vacuum. As a result, the actual addition of chlorine will rapidly follow any change in the water flow independent of any changes in the pressure of the chlorine fed to valve 5.

Inasmuch as the vacuum controlled by control device 25 is proportional to the rate of flow of the water and the pressure acting upon device 25, the vacuum pressure can be used directly to indicate the volume of the water flow to be treated. A manometer 38 appropriately calibrated for the flow of water is connected to pipe 24.

As already mentioned, a particular advantage of the invention is that the dosing installation formed by valve 5 and its associated components can be located independently of the location of the pressure drop responsive control device 25. Furthermore, the dosing installation proper is not exposed to the frequently very high static pressures of the water flow in the main, but only to a vacuum which is proportional to the pressure in the main.

While the invention has been described in detail with respect to a certain now preferred example and embodiment of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An installation for treating water flowing through a water main by adding to a by-pass flow branched off from said main and returned into same a quantity of gaseous chlorine corresponding to the rate of flow in said main, said installation comprising an injector adapted to be included in said by-pass, a vacuum responsive chlorine dosing valve having an input side and an output side, a feed pipe for feeding chlorine under pressure connected to the input side of said valve, a suction pipe connecting the output side of said valve to said injector for generating a vacuum in said suction pipe and valve, opening of said dosing valve connecting said chlorine feed pipe and said suction pipe, said dosing valve including a valve control member movable between a valve opening position and a valve closing position and a diaphragm exposed on one side to the vacuum in said suction pipe and on the other side to the ambient atmospheric pressure and coupled with said valve control member to control the position thereof, the flexing of said diaphragm controlling the opening and closing of said valve in accordance with the pressure differential between the ambient atmospheric pressure and the vacuum in said valve, and a control valve adapted to be connected to said water main for control of said dosing valve by the rate of flow of water through said main, said control valve including means responsive to the rate of flow in the main and operatively connected to said movable member of said dosing valve for superimposing to the control of the position of the movable member as effected by the diaphragm, a control of the position of the movable member in accordance with the flow rate in said main.

2. An installation according to claim 1 wherein said chlorine dosing valve comprises pressure compensating means varying the opening of the dosing valve as effected by combined control of the position of said movable member, in accordance with changes in the chlorine pressure.

3. An installation according to claim 1 wherein said vacuum responsive dosing valve comprises a housing including a lower first and an upper second compartment, said diaphragm being mounted within the lower compartment and a second diaphragm being mounted within the upper compartment, each of said diaphragms dividing the respective compartments in an upper and a lower chamber, the flexing of the diaphragm in the second compartment being controlled by said control valve in accordance with the rate of flow of water flowing through said main, said housing defining a valve opening for connecting said chlorine feed pipe with said suction pipe through the lower chamber in the first compartment, a valve disc coacting with said valve opening to control the opening and closing thereof, actuating means coupling said diaphragms to each other and to one side of said valve disc to exert upon the disc an opening force corresponding to the combined flexed position of said diaphragms, and yieldable means mounted within a portion of said housing and acting upon the other side of said disc to exert a closing force upon said disc whereby the position occupied by the disc in reference to the valve opening is a function of the opposed forces acted upon the same.

4. An installation according to claim 3 wherein said actuating means comprises a first pin mounted on the diaphragm in the first compartment and abutting against said valve disc and a second pin mounted on the diaphragm in the second compartment and abutting against the diaphragm in the first compartment to transmit flexing of the diaphragm in the second compartment to the diaphragm in the first compartment.

5. An installation according to claim 3 wherein the upper chamber in the first compartment is open to the atmosphere and the lower chamber in said compartment communicates with said suction pipe under vacuum and includes said valve opening, said chlorine feed pipe communicates with the housing portion including said yieldable means, and said valve disc being interposed between said housing portion and said lower chamber, and wherein the upper chamber in the second compartment is open to the atmosphere and the lower chamber in said second compartment is at a pressure controlled by said second control valve.

6. An installation according to claim 1 wherein said control valve comprises a housing divided in an upper first compartment and a lower second compartment, a diaphragm mounted in each of said compartments to divide each compartment in an upper and a lower chamber, means adapted to be inserted in said water main for effecting a pressure drop therein corresponding to the rate of flow in said main, a conduit adapted for connecting the lower chamber of the second compartment with said main up-stream of said means and a conduit adapted for connecting the upper chamber of the second compartment with said main down-stream of said means, the pressure differential between said two chambers controlling the flexing of the diaphragm in the second compartment of the control valve, the upper chamber of the first compartment in said control valve being open to the atmosphere and the lower chamber in the first compartment being connected to said dosing valve for effecting said superimposed control of the position of the movable member of said dosing valve in accordance with the pressure in the lower chamber in the first compartment of the control valve, a pipe under vacuum connected to said suction pipe, an auxiliary valve for connecting in one position the lower chamber in the first compartment of the control valve to said pipe under vacuum and in another position to the atmosphere thereby correspondingly varying the pressure in said lower chamber, the flexing of the diaphragm in the first compartment of the control valve being controlled by the pressure differential between the two chambers thereof, said auxiliary valve being coupled with the diaphragms in the two compartments of the control valve for moving said auxiliary valve into either of said positions in accordance with combined flexing of said diaphragms.

7. An installation according to claim 6 wherein said auxiliary valve comprises a valve tube closed at both ends and having an upper and a lower port in its wall, said valve tube extending between said two diaphragms secured thereto to be longitudinally displaced in accordance with the flexing of the said diaphragms and having a portion protruding above the diaphragm in the upper compartment, the upper port in the tube being located in the protruding tube portion and the lower port openings always in the lower chamber in the first compartment of the control valve, said upper port being located in said one position of the tube within said pipe under vacuum to create through the lower port a vacuum in the lower chamber of the first compartment of the control valve and in said other position of the tube within the upper chamber in the first compartment to connect said lower chamber to the atmosphere through said tube.

8. An installation according to claim 7 and comprising a manometer for indicating the rate of flow in said water main, said manometer communicating with the lower chamber in the first compartment of the control valve for control by the pressure therein, said pressure being indicative of the flow rate in the main.

9. An installation according to claim 1 wherein said vacuum responsive dosing valve comprises a housing including a lower first and an upper second compartment, a diaphragm mounted within each compartment to divide each compartment in an upper and a lower chamber, the flexing of the diaphragm in the first compartment being controlled by said pressure differential between the ambient atmospheric pressure and the vacuum in said suction pipe and the flexing of the diaphragm in the second compartment being controlled by said flow responsive means of the control valve in accordance with the rate of flow of water flowing through said main, said housing defining a valve opening for connecting said chlorine feed pipe with said suction pipe through the lower chamber in the first compartment, said movable member of the dosing valve including a valve disc coacting with said valve opening to control the opening and closing thereof, actuating means coupling said diaphragms to each other and to one side of said valve disc to exert upon the disc an opening force corresponding to the combined flexed position of said diaphragms and yieldable means mounted within a portion of said housing and acting upon the other side of said disc to exert a closing force upon said disc whereby the position occupied by the disc in reference to the valve opening is a function of the opposed forces acted upon the same, and wherein said control valve comprises a housing divided in an upper first compartment and a lower second compartment, a diaphragm mounted in each of said compartments to divide each compartment in an upper and a lower chamber, means adapted to be inserted in said water main for effecting a pressure drop therein corresponding to the rate of flow in said main, a conduit for connecting the lower chamber of the second compartment with said main up-stream of said means and a conduit for connecting the upper chamber of the second compartment with said main down-stream of said means, the pressure differential between said two chambers controlling the flexing of the diaphragm in the second compartment of the control valve, the upper chamber of the first compartment in said control valve being open to the atmosphere and the lower chamber in the first compartment being connected to the lower chamber in the second compartment of said dosing valve for controlling the opening of said valve in accordance with the pressure in said lower chamber in the first compartment of the control valve, a pipe under vacuum, an auxiliary valve for connecting in one position the lower chamber in the first compartment of the control valve to said pipe under vacuum and in another position to the atmosphere thereby correspondingly varying the pressure in said lower chamber, said auxiliary valve being coupled with the diaphragms in the two compartments of the control valve for controlling the position of said auxiliary valve by the flexing of said diaphragms.

10. An installation according to claim 1 wherein said control valve constitutes a self-contained subassembly adapted to be disposed closely adjacent to said water main and remote from said dosing valve.

No references cited.